No. 696,999. Patented Apr. 8, 1902.
C. C. NEALE.
GRAIN FLOW INDICATOR.
(Application filed June 10, 1901.)
(No Model.) 3 Sheets—Sheet 1.

Witnesses.

Inventor
Charles C. Neale,
By his Attorneys

No. 696,999.  
C. C. NEALE.  
GRAIN FLOW INDICATOR.  
(Application filed June 10, 1901.)

Patented Apr. 8, 1902.

(No Model.)

3 Sheets—Sheet 2.

Witnesses.

Inventor.
Charles C. Neale,
By his Attorneys.

No. 696,999. Patented Apr. 8, 1902.
C. C. NEALE.
GRAIN FLOW INDICATOR.
(Application filed June 10, 1901.)
(No Model.) 3 Sheets—Sheet 3.
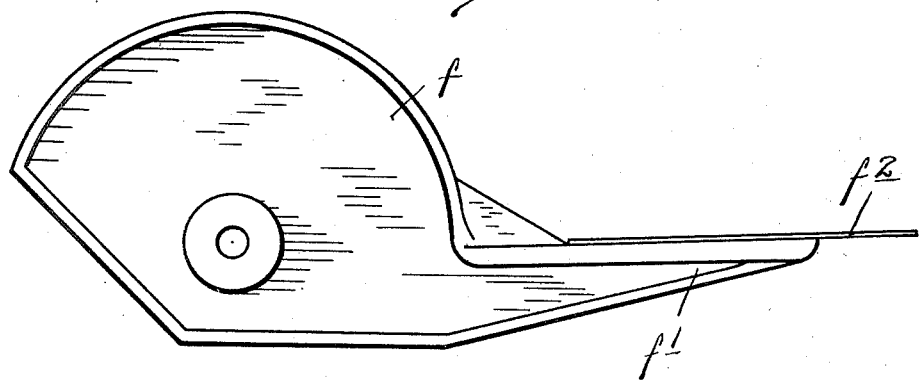
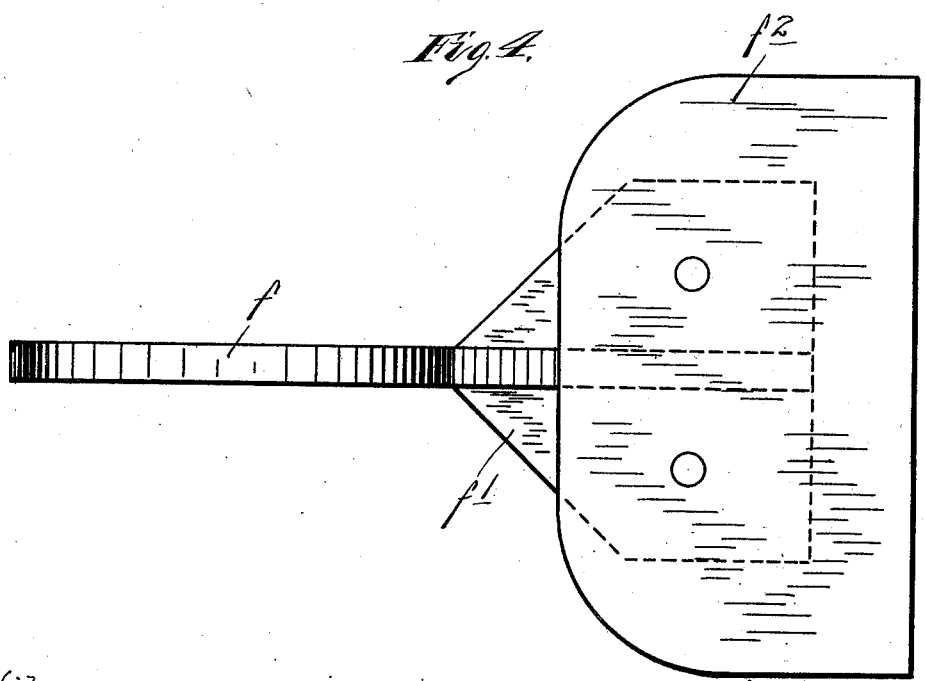
Witnesses.
C. H. Turner.
Harry Kilgord.
Inventor.
Charles C. Neale.
By his Attorneys.
Williamson & Merchant

UNITED STATES PATENT OFFICE.

CHARLES C. NEALE, OF MINNEAPOLIS, MINNESOTA.

GRAIN-FLOW INDICATOR.

SPECIFICATION forming part of Letters Patent No. 696,999, dated April 8, 1902.

Application filed June 10, 1901. Serial No. 63,883. (No model.)

*To all whom it may concern:*

Be it known that I, CHARLES C. NEALE, a citizen of the United States, residing at Minneapolis, in the county of Hennepin and State of Minnesota, have invented certain new and useful Improvements in Grain-Flow Indicators; and I do hereby declare the following to be a full, clear, and exact description of the invention, such as will enable others skilled in the art to which it appertains to make and use the same.

My invention is especially directed to the improvement of weighing-scales wherein hoppers are employed, and has for its object to provide an improved indicator or detecting device which will positively indicate when there is a flow of grain from the hopper and which will also indicate whether or not any grain has been drawn off from the hopper or whether any grain still remains therein.

My invention is especially adapted for application to the large hoppers of grain-weighing scales, such as are used in connection with elevators and other grain-storage depots or distributing-houses.

My invention is illustrated in the accompanying drawings, wherein like characters indicate like parts throughout the several views.

Figure 1:
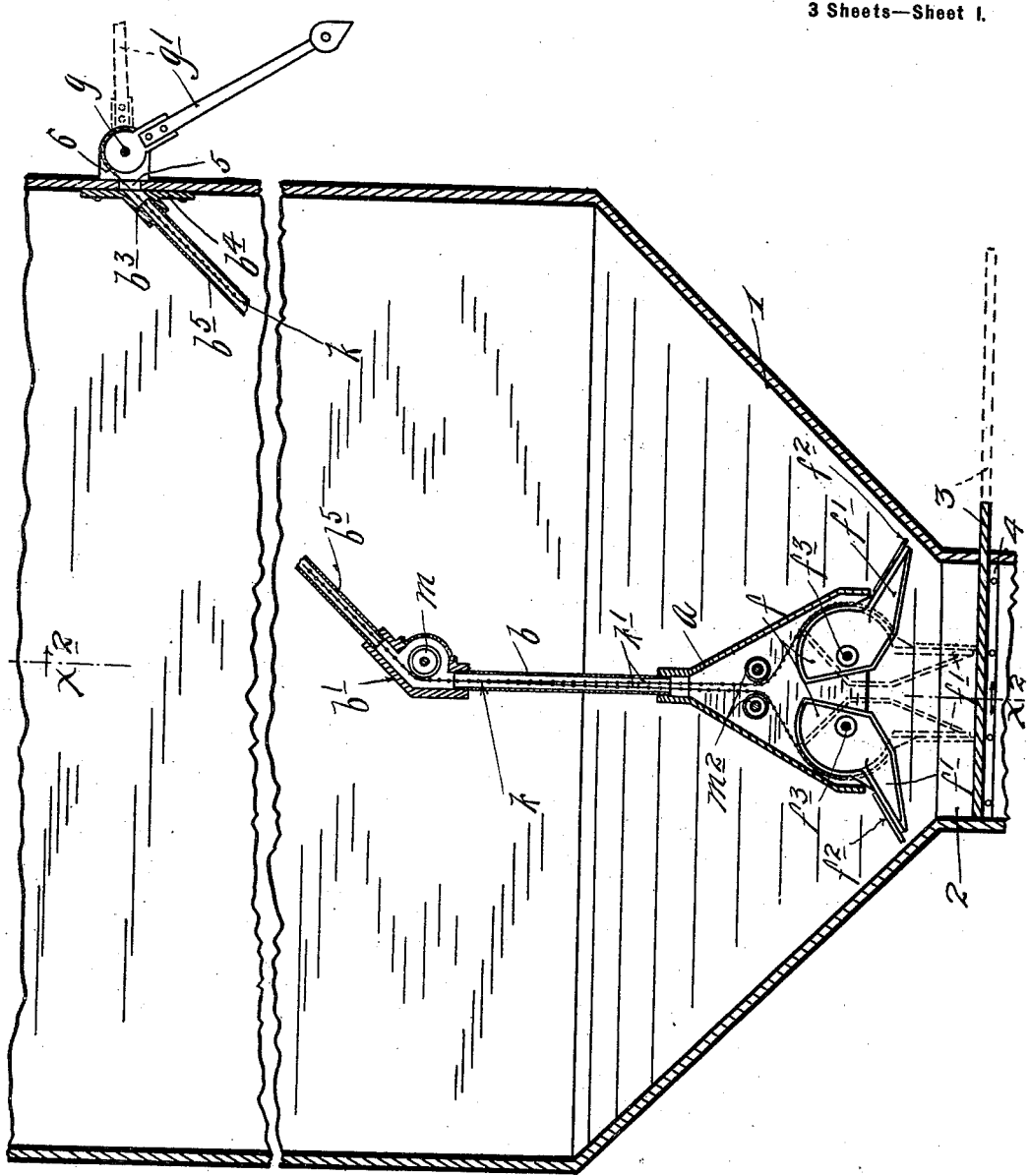
Figure 2:
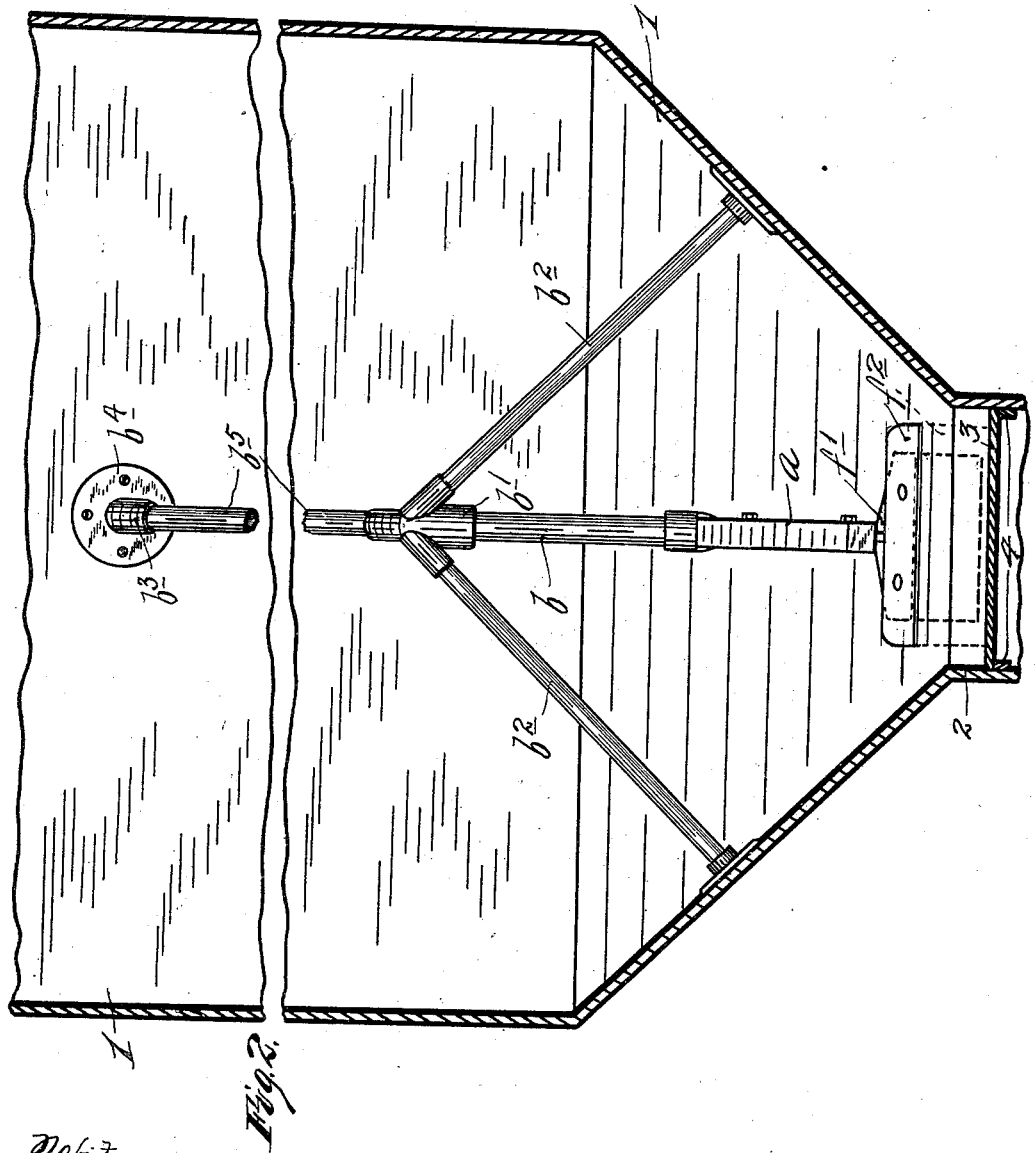

Figure 1 is a view in vertical section, with some parts broken away, showing the hopper of an ordinary grain-weighing scales having applied thereto one of my improved indicating devices. Fig. 2 is a vertical section of the hopper on the line $x^2 x^2$ of Fig. 1, but with other parts shown in full and some parts being broken away. Fig. 3 is a detail in side elevation of one of the actuating segments or members removed from working position, and Fig. 4 is a plan view of the member shown in Fig. 3.

The hopper, which is of ordinary construction, is indicated by the numeral 1. In its contracted lower end section or neck 2 said hopper is provided with an ordinary cut-off gate or valve 3, which, as shown, works through one side of the same and is supported by side bars or flanges 4.

Within the hopper 1, a short distance above the gate 3, is supported a hollow, flat, and upwardly-diverging wedge-shaped housing $a$, the contracted upper end of which is rigidly secured to the depending end of a supporting tube or pipe $b$, the upper extremity of which pipe is in turn rigidly secured to a hollow casting or housing $b'$, rigidly supported from the sides of the hopper by inclined radial legs $b^2$. Extending upward from the housing $b'$ and connecting with the hub $b^3$ of a plate $b^4$ is an inclined pipe $b^5$. The plate $b^4$ is riveted or otherwise secured to the side of the hopper, and the perforation in the hub thereof registers with the perforation 5 in the side of the hopper.

As shown, the so-called "actuating segments or members" are made up of segmental sheaves having projecting arms $f'$, to which blades $f^2$ are secured by rivets or otherwise. The construction of these members may, however, be varied in many respects, although the blades $f^2$ are preferably formed of thin sheet metal and detachably secured to the other parts. The said actuating members are pivoted at $f^3$ to the sides of the shield $a$, as best shown on Fig. 1, wherein it will be noted that the segmental sheave portions $f$ work within and are protected by the said shield, while the arms $f'$ and the blades $f^2$ project beyond the same in opposite directions.

In practice blade portions $f^2$ will be furnished of such size that they may be closely fitted at their outer edges to the inclined bottom of the particular hopper to which they are applied.

Pivoted to a bracket 6, located on one side of the hopper in the vicinity of the perforation 5, is the hub $g$ of an indicator-arm or semaphore $g'$. The upper end of a chain or other flexible connection $k$ is attached to the hub $g$, and this chain is passed through the perforation 5, through the hub $b^3$, through the pipe $b^5$, through the housing $b'$, and over a sheave $m$, mounted within said housing $b'$. Below the sheave $m$ the chain or connection $k$ is provided with two strands or sections $k'$, the lower ends of which are secured one to each of the segmental sheaves. The strands $k'$ pass between a pair of guide-sheaves $m^2$, mounted within the shield $a$, which sheaves guide said strands $k'$ upward through depending pipe-section $b$.

With the device above described whenever grain is permitted to flow from the hopper one or the other of the blades $f^2$ will be forced downward, thereby acting through the flexible connections $k'$ to raise the semaphore-arm $g'$ and indicate that such flow has taken place. As the actuators $f f' f^2$ act independently the one of the other to raise the indicator-arm $g'$, the proper indication will always be given whether the flow of grain be equal at both sides of the discharge-opening or whether it be entirely from one side thereof. As a matter of fact, with a sliding gate or valve at the bottom the initial flow of the grain upon opening the said gate will be at one side. Hence it is of the greatest importance that the actuators be capable of independent movements— that is, the one free for an operative movement, while the other is held stationary by the grain. As the shield $a$ is very narrow, it will not to any perceptible extent retard or interfere with the flow of the grain through the hopper.

As the blades of the actuating member are placed within the hopper and at the very bottom of the same, it is evident that when one of the actuators has been moved by the flow of grain from the hopper it will be impossible to return the same to its normal position or to restore the indicator-arm or semaphore to its normal position as long as any grain remains in the hopper. Hence this device acts not only to indicate when a leakage or flow of grain is taking place, but also to indicate whether or not any part of the weighed load of grain has been previously drawn off by leakage or otherwise and, further, to indicate whether or not any part of that load has been held back or allowed to remain in the hopper. For these reasons the device above described answers all of the requirements of an indicator or detector for the purpose noted, as it will indicate all manipulations, accidental or otherwise, which will cause inaccurate or improper distribution or deposits of the grain from the hopper.

If desired, shields or guards may be placed at suitable distances above the blades $f^2$, so as to prevent the grain when the hopper is being filled from falling directly on the said blades. However, in practice I have not usually found this necessary, as the grain rapidly packs from the sides in under the said blades.

It will of course be understood that the device above described is capable of a large range of modification within the scope of my invention.

What I claim, and desire to secure by Letters Patent of the United States, is as follows:

1. The combination with a hopper or grain-receptacle having a discharge-opening in its bottom, of an indicator or semaphore at the exterior of the hopper, and an actuator for said indicator located within said hopper, near the bottom thereof, and in the vicinity of the discharge-opening thereof, which actuator has a connection to said indicator and is subject to the flow of the grain in the discharging action, substantially as described.

2. The combination with a hopper or grain-receptacle, of an indicator or semaphore, and a pair of independently-movable indicator-actuators located within said hopper and subject to the outward flow of the grain therefrom, both of which actuators have connections for action on said indicator, substantially as described.

3. The combination with a hopper or grain-receptacle, of a semaphore pivoted at the exterior thereof, and an actuator for said semaphore comprising a pivotally-mounted blade with connections to said semaphore mounted within said hopper, in the vicinity of the bottom discharging-opening thereof, substantially as described.

4. The combination with a hopper or grain-receptacle, of a semaphore pivoted at the exterior thereof, a pair of independently-movable actuating-blades pivoted within said hopper in the vicinity of the bottom discharge-opening thereof, and flexible connections between said actuator blades or members and said semaphore, substantially as described.

5. The combination with a hopper 1, of the flattened shield $a$, tubular connections extending from the said shield $a$ to one side of the hopper, the semaphore $g'$ pivoted to the exterior of said hopper, the independently-mounted sheaves $f$ having exposed blades $f^2$, the flexible connections $k$ attached to the hub of said arm $g'$ and provided at the lower end with the strands $k'$ connected, one to each of the sheaves $f$, and suitable guide-sheaves within said shield $a$ and in said tubular connections therefrom, over which said connections $k, k'$ are passed, substantially as described.

6. The combination with a hopper or grain-receptacle having a discharge-opening in its bottom, of an indicator or semaphore at the exterior of said hopper, a pivoted or hinged actuating-blade mounted within said hopper, near the bottom thereof, and in the vicinity of this discharge-opening, and a flexible connection between said actuating-blade and said indicator, substantially as described.

In testimony whereof I affix my signature in presence of two witnesses.

CHARLES C. NEALE.

Witnesses:
ANNE S. READ,
F. D. MERCHANT.